United States Patent [19]

Leclercq

[11] 4,303,476
[45] Dec. 1, 1981

[54] DISMOUNTABLE FUEL ASSEMBLY FOR NUCLEAR REACTOR

[75] Inventor: Joseph Leclercq, Le Vesinet, France

[73] Assignee: Societe Franco-Americaine de Construction Atomiques-Framtome, Courbevoie, France

[21] Appl. No.: 100,216

[22] Filed: Dec. 4, 1979

Related U.S. Application Data

[63] Continuation of Ser. No. 840,371, Oct. 7, 1977, abandoned.

[30] Foreign Application Priority Data

Oct. 20, 1976 [FR] France .............................. 76 31554

[51] Int. Cl.³ .............................................. G21C 3/34
[52] U.S. Cl. .................................................... 376/446
[58] Field of Search .............................. 176/76, 78, 79

[56] References Cited

U.S. PATENT DOCUMENTS

| | | | |
|---|---|---|---|
| 3,481,832 | 12/1969 | Rickert | 176/78 |
| 3,915,793 | 10/1975 | Andersson | 176/78 |
| 3,953,287 | 4/1976 | Long | 176/78 |
| 3,992,259 | 11/1976 | Anthony | 176/78 |
| 4,030,975 | 6/1977 | Anthony | 176/78 |

Primary Examiner—Donald P. Walsh

Attorney, Agent, or Firm—Haseltine and Lake

[57] ABSTRACT

An easily dismountable fuel assembly for a nuclear reactor comprising a bundle of parallel fuel slugs held spaced apart by cross-pieces transverse to the slugs and by assembly bearing tubes which take the places of some of the slugs, the tubes being longer than the slugs and being secured at each end to a respective plate for maintaining the fuel assembly rigid. Each tube is secured to at least one end plate by a cylindrical sleeve comprising a connection complementary with a corresponding connection borne by the respective end of the tube and formed with a profile for engagement by a tool for rotating the sleeve around its axis in one direction for securing it to the tube and clamping the tube to the end plate in the axial direction, and in the other direction for releasing the tube from the plate. Each sleeve is disposed in an aperture in the plate which aperture is coaxial with the tube and the sleeve extending through the end plate abutting the end plate by a shoulder and comprising a deformable part deformable into a recess in the end plate for preventing the tube from rotating the end of the bearing tube comprising an expanded portion having a prismatic outer surface for engaging in a correspondingly shaped recess formed in the end plate.

9 Claims, 3 Drawing Figures

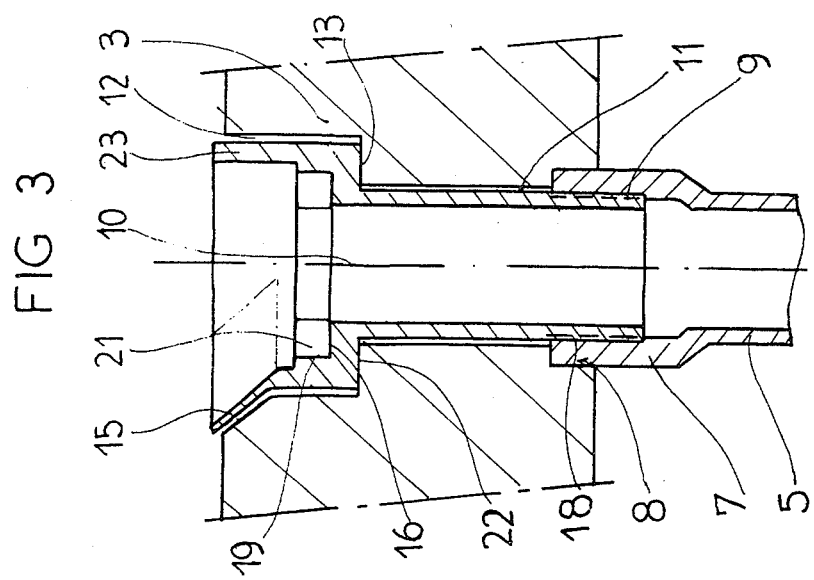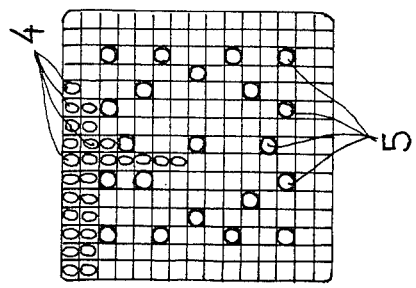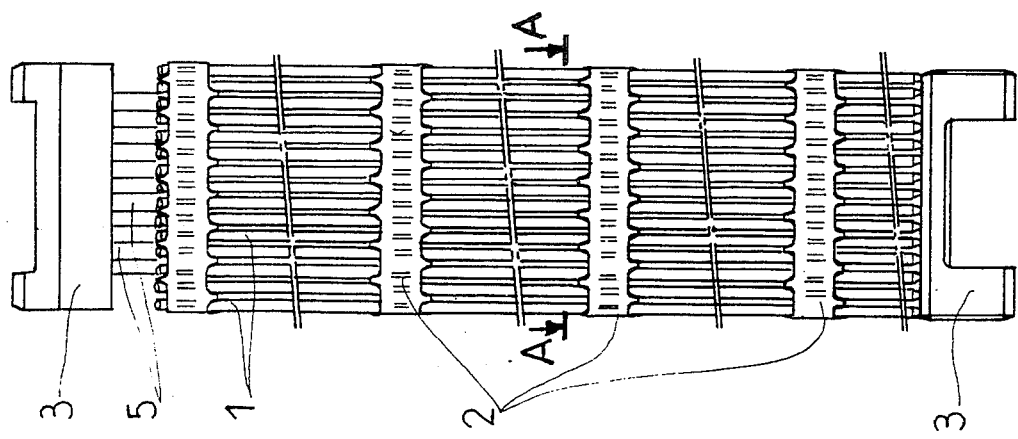

4,303,476

DISMOUNTABLE FUEL ASSEMBLY FOR NUCLEAR REACTOR

This is a continuation of application Ser. No. 840,371, filed Oct. 7, 1977, now abandoned.

FIELD OF THE INVENTION

The invention relates to a dismountable fuel assembly for a nuclear reactor.

PRIOR ART

The fuel slugs in nuclear reactors are usually formed into bundles, in which the slugs are disposed parallel to one another, the spacing between them being maintained by cross-pieces extending transversely to the slugs. Some fuel slugs are replaced by bearing tubes, somewhat longer than the slugs, and secured at each end to end plates, the tubes being adapted to strengthen the fuel assembly.

When a nuclear reactor core is recharged, it is extremely important to be able to change defective slugs in the irradiated fuel elements and replace them so that the fuel assembly can continue in use without the reactor circuit being contaminated by fission products coming from defective slugs.

This method has the advantage of saving fuel, since the repaired assembly can be recharged and re-used after defective slugs have been eliminated and replaced.

In addition, the replacement of defective slugs results in safer reactor operation, as far as the installations and staff are concerned, by reducing the risk of contamination.

However, great precautions are necessary when changing defective slugs. The irradiated element can be repaired only under a radiological shield. Usually the operation is performed under a layer of water in a pool adjacent the reactor.

For certain more specific reasons, e.g. for examining certain slugs or making mechanical or physical tests thereon, the assemblies may need to be dismantled in order to recover the slugs which have been tested or examined.

In order to reach the slugs and separate them from the rest of the assembly, it is necessary to dismantle the end plates secured to the bearing tubes. The dismantling operation, which is performed in a pool, presents certain difficulties since the element is accessible only at a distance and the dismantling operation is performed when the assembly is immersed.

SUMMARY OF THE INVENTION

It is an object of the invention to provide an easily dismountable fuel assembly for a nuclear reactor, comprising a bundle of parallel fuel slugs held spaced apart by cross-pieces transverse to said slugs and by assembly-bearing tubes which take the place of some of the slugs, said tubes being longer than said slugs and being secured at each end to a respective plate for maintaining said fuel assembly rigid, each said tube being secured to at least one said end plate by a cylindrical sleeve comprising connection means complementary with corresponding means borne by the respective end of said tube and formed with a profile for engagement by a tool for rotating said sleeve around its axis in one direction for securing it to said tube and clamping said tube to said end plate in the axial direction, and in the other direction for releasing said tube from said plate, wherein each said sleeve is disposed in an aperture in said plate which aperture is coaxial with said tube, said sleeve extending through said end plate and abutting said end plate by a shoulder and comprising a deformable part deformable into a recess in said end plate for preventing said tube from rotating, said end of said bearing tube comprising an expanded portion having a prismatic outer surface for engaging in a correspondingly-shaped recess formed in said end plate.

The invention will be more fully understood from the following description of an embodiment of a fuel assembly according to the invention, given by way of example only with reference to the accompanying drawings.

BRIEF DESCRIPTION OF THE SEVERAL VIEWS OF THE DRAWING

In the drawings:

FIG. 1 is a side elevational view of a conventional nuclear reactor fuel assembly;

FIG. 2 is a cross-section taken along line A—A of FIG. 1, showing the arrangement in the slugs and the bearing tubes inside a cross-piece; and FIG. 3 is a larger scale cross-section showing how a bearing tube is connected to an end plate in an embodiment of an assembly according to the present invention.

DETAILED DESCRIPTION

The fuel assembly shown in FIG. 1 comprises a set of parallel slugs 1 held in a rigid bundle by transverse cross-pieces 2 disposed at substantially regular intervals along the slugs.

FIG. 2 shows how the slugs 1 are transversely disposed in a cross-piece 2. Cross-piece 2 is formed with cells 4 containing the slugs. Some cells 4 are occupied by bearing tubes 5, which take the place of a certain number of fuel slugs. The tubes 5 are somewhat longer than the slugs 1, and are joined at their respective ends to an end plate 3.

The assembly can be dismantled by removing the end plate 3 after disconnecting the bearing tubes 5 from plate 3.

The slugs can then be extracted and replaced by sliding them horizntally out of the cross-pieces.

FIG. 3 shows a tube 5 connected to a plate 3. In FIG. 3, the end 7 of tube 5 comprises an expanded portion which rests in a recess 8 in plate 3. In the configuration shown in FIG. 3, the recess 8 is prismatic and the expanded portion 7 has a hexagonal outer surface. The inner surface of portion 7 is cylindrical with a circular cross-section. The inner cylindrical surface has a thread 9 which extends over a certain length of portion 7. Recess 8 opens into a passage 10 extending right through plate 3. Accordingly, the passage 10 in plate 3 is coaxial with tube 5 when positioned in the bundle. In the direction from recess 8 to the top surface of the plate 3, passage 10 comprises a cylindrical part 11 having a relatively small diameter circular cross-section and a larger diameter part 12 opening at the upper surface of end plate 3. A flat shoulder 13 is formed between the two parts 11, 12 of the passage.

At the upper end of part 12 of passage 10 there is a recess 15 which does not have symmetry of revolution about the axis of tube 5.

Inside the passage 10 in plate 3, a sleeve 16 is disposed so that, when tube 5 is in the locked position as shown in FIG. 3, a thread 18 on sleeve 16 is screwed into the thread 9 of tube 5. Thread 18 is formed on the lower end part of sleeve 16, which is cylindrical with a circular cross-section. The diameter of the last mentioned part of sleeve 16 is slightly less than the part 11 of the passage 10 in plate 3. The smaller diameter part of sleeve 16 is prolonged by a larger diameter part 19 comprising a solid part formed with an internal slot 21 for inserting a screwdriver blade, the solid part being in turn prolonged by a thin collar 23, the part of the collar in recess 15 of bore 12 being bent out by expansion inside the recess 15 after the sleeve 16 has been completely screwed engage shoulder 22 on the solid part of the sleeve with shoulder 13 of the passage in the plate 3.

When sleeve 16 has been completely screwed in by using a screwdriver engaged in the slot 21 formed on the solid part of the sleeve, the expanded end 7 of tube 5 abuts the bottom of recess 8, and as mentioned above, the shoulder 22 of sleeve 16 abuts the corresponding shoulder 13 of the passage in the plate 3. The bearing tube is then firmly secured to the end plate without longitudinal clearance. Finally, part of the collar 23 is expanded inside recess 15 in order to prevent further rotation of the tube.

When the tubes have thus been secured to the end plate, the fuel assembly is rigid.

In order to change slugs in the assembly, tube 5 can be disconnected from plate 3 inside a pool, simply by inserting a screwdriver blade into the slot 21 and unscrewing the sleeve. That part of the thin collar 23 which has penetrated into recess 15 during the expansion of the collar is deformed by the force exerted during unscrewing and finally yields and releases sleeve 16, which can be completely unscrewed so as to disconnect plate 3 from the tube 5.

Accordingly, by a simple unscrewing operation, which can easily be performed at a distance using a special tool, each bearing tube can be dismantled and the end plate 3 can be released, thus giving access to the slug.

When a fuel element is assembled, each collar 23 can be expanded inside recess 15 in a very simple manner, by pressing a large diameter tool against the inner wall of collar 23.

The advantage of the above described arrangement is that the bearing tubes are locked in a completely mechanical manner and can therefore be dismantled without machining operations, e.g. grinding or cutting, which might contaminate parts of the fuel assembly. Similarly, the device eliminates any welding operation, which has the same risks of contamination.

Another advantage of the above described connection between the tube and the plate is that no torsion is exerted on tube 5, which is prevented from rotating in recess 8.

Sleeve 16 is usually made of stainless steel of the same quality as the other parts of the assembly.

The invention is not intended to be limited to the embodiment which has been described, but includes all variants, and equivalent means may be used without thereby departing from the scope of the invention. For example, the end of tube 5 can have a cross-section of any external shape, the end being disposed in a recess formed for holding it in the end plate 3. Sleeve 16 can be secured to the end of tube 5 in any manner, involving rotation of sleeve 16. For example, a bayonet connection can be used between sleeve 16 and the end of tube 5.

Instead of a slot for a screwdriver, sleeve 16 can have a hexagonal or square recess into which a correspondingly shaped key can be inserted. The sleeve can be entirely tubular, as shown in FIG. 3, or it can have solid parts preventing access to the interior of the bearing tube from the exterior of the assembly.

It may however be advisable to provide a passage from the exterior of the assembly through the interior of the tube, e.g. for inserting control elements or measuring instruments or for a flowing fluid.

The deformable collar 23 of sleeve 16 can be disposed in any part of the collar, for example, it can form part of a smaller diameter region of the sleeve, in which case one or more recess 15 are provided in the smaller diameter part 11 of the passage in end plate 3.

The description in connection with FIG. 3 concerns the securing of a bearing tube to a top end plate of a fuel assembly. However, the bearing tubes can be secured as described above to either the top end plate or the bottom end plate or to both end plates. In some cases it is desirable to dismantle the assembly by removing the bottom end plate, in which case the bearing tubes are secured to the bottom end plate as described above.

What is claimed is:

1. An easily dismountable fuel assembly for a nuclear reactor, said assembly comprising:
   a bundle of parallel fuel slugs;
   a plurality of cross pieces extending transversely to said slugs and holding said slugs spaced apart;
   a plurality of assembly bearing tubes taking the place of some slugs and longer than said slugs;
   end plates arranged at each end of said bundle of slugs; and
   means for securing each of said tubes to each of said end plates; said securing means for securing said tubes to at least one of said end plates comprising, in respect of each tube a cylindrical sleeve substantially entirely enclosed in an aperture in said one end plate, said aperture being coaxial with said respective tube and said sleeve extending through said plate and abutting said plate by a shoulder provided on said sleeve, connection means on said sleeve for engagement with corresponding connection means on the respective end of said tube by relative rotation of said sleeve and tube, said sleeve having means for engagement by a tool for rotating said sleeve about its axis in one direction for connecting said sleeve to said tube and clamping said tube to said end plate in an axial direction, and for rotating said sleeve in the opposite direction for disconnecting said sleeve from said tube, said end of said tube comprising an expanded portion having a prismatic outer surface for engagement in a correspondingly shaped first recess in said end plate to prevent relative rotation between said tube and said plate, said sleeve having a deformable portion deformable into a second reces in said end plate for preventing rotation of said sleeve relative to said end plate.

2. A fuel assembly according to claim 1, wherein said connection means for connecting each said sleeve to a respective said tube comprises threads formed on the inner surface of the said end of said tube and on the outer surface of the respective end of said sleeve.

3. A fuel assembly according to claim 1, wherein said connection means for connecting each said sleeve to a respective said tube comprises a bayonet connection.

4. A fuel assembly according to claim 1, wherein each said sleeve is tubular and provides access to the interior of the respective tube from the exterior of the assembly.

5. A fuel assembly according to claim 4, wherein said deformable portion of each said sleeve comprises a thin tublar collar.

6. A fuel assembly according to claim 5, wherein said end plate has a passage inclusive of said first and second recesses, said passage being provided with two spaced shoulders respectively engaging an end of said tube and said shoulder on said sleeve, said second recess tapering in widening manner away from said tube.

7. A fuel assembly according to claim 6, wherein said passage has a cylindrical portion between said shoulders receiving said sleeve with clearance.

8. A fuel assembly according to claim 6, wherein said passage has a cylindrical portion extending from said shoulder which abuts the shoulder on the sleeve, said second recess extending laterally outwards from said cylindrical portion over a part of the angular extent thereof.

9. A fuel assembly according to claim 8, wherein said second recess is tapered.

* * * * *